(12) United States Patent
Chaudhry

(10) Patent No.: US 7,142,402 B1
(45) Date of Patent: Nov. 28, 2006

(54) WIRING ERROR DETECTION CIRCUIT

(75) Inventor: Nisar A. Chaudhry, Huntington Station, NY (US)

(73) Assignee: TII Network Technologies, Inc., Copiague, NY (US)

( * ) Notice: Subject to any disclaimer, the term of this patent is extended or adjusted under 35 U.S.C. 154(b) by 540 days.

(21) Appl. No.: 10/635,341

(22) Filed: Aug. 6, 2003

Related U.S. Application Data

(63) Continuation-in-part of application No. 10/408,065, filed on Apr. 4, 2003, now Pat. No. 7,088,564, and a continuation-in-part of application No. 10/216,367, filed on Aug. 9, 2002, now Pat. No. 6,775,121.

(51) Int. Cl.
*H02H 9/08* (2006.01)
*G08B 21/00* (2006.01)

(52) U.S. Cl. .................................... 361/42; 340/650

(58) Field of Classification Search ................. 361/42, 361/45; 340/650
See application file for complete search history.

(56) References Cited

U.S. PATENT DOCUMENTS

| | | | |
|---|---|---|---|
| 4,212,047 A | | 7/1980 | Napiorkowski |
| 5,541,800 A | * | 7/1996 | Misencik ...................... 361/45 |
| 5,566,056 A | | 10/1996 | Chaudhry |
| 5,627,719 A | * | 5/1997 | Gaston ........................ 361/103 |
| 5,642,248 A | * | 6/1997 | Campolo et al. ............. 361/42 |
| 6,252,754 B1 | | 6/2001 | Chaudhry |

* cited by examiner

*Primary Examiner*—Brian Sircus
*Assistant Examiner*—Boris Benenson
(74) *Attorney, Agent, or Firm*—Morgan & Finnegan, LLP

(57) ABSTRACT

A wiring error detection circuit for providing the status of the wiring of an AC outlet and the status of the AC outlet's ground connection.

14 Claims, 13 Drawing Sheets

WIRING ERROR DETECTION CIRCUIT

CROSS REFERENCE TO RELATED APPLICATIONS

This application is a continuation-in-part of commonly assigned U.S. patent application Ser. No. 10/216,367 filed Aug. 9, 2002 now U.S. Pat. No. 6,775,121 and U.S. patent application Ser. No. 10/408,065 filed Apr. 4, 2003 now U.S. Pat. No. 7,088,564.

BACKGROUND OF THE INVENTION

1. Field of the Invention

The present invention relates to a circuit for detecting wiring errors in an AC outlet.

2. Discussion of the Related Art

A typical AC outlet includes a means for connecting to an AC line, an AC neutral and a ground. Most users of AC outlets insert two and/or three prong AC plugs (connected to electronic devices) into an AC outlet without knowing whether or not the AC outlet's internal wiring is good or bad. In addition, the status of the AC outlet's ground connection is typically unknown. This uncertainty regarding the status of the AC outlet's internal wiring and ground connection can be particularly harmful to the electronic device and in some instances to the user.

For example, if the user of a computer plugged the computer into an AC outlet with reversed AC line and AC neutral wiring (and/or a bad ground) and a "hot" wire inside the computer were to come loose, the user would get a potentially fatal shock if they were to touch the metal casing of the computer. In addition, the computer's internal components could be damaged due to the overvoltage condition. However, if the computer was connected to an AC outlet with proper AC wiring (and/or a good ground) and the "hot" wire were to come loose, a fuse would trip in the fuse box causing the device to turn off, thereby a user coming into contact with the computer would not receive a shock and the computer's internal components would remain unharmed.

As a result, there is a need for a circuit that provides the status of the wiring of an AC outlet and the status of the AC outlet's ground connection.

SUMMARY OF THE INVENTION

The present invention overcomes the foregoing and other problems encountered in the known teachings by providing a wiring error detection circuit for determining whether or not a wiring problem exists in an AC outlet and for determining whether or not a ground is present in an AC outlet. Advantageously, the circuit indicates the presence of a wiring problem via light emitting diodes, thereby, alleviating the risks associated with connecting to an improperly wired AC outlet. Further, the circuit indicates either the presence or absence of a ground connection through light emitting diodes, thus, reducing the risks associated with connecting to an AC outlet having a bad ground connection.

In one embodiment of the present invention, a wiring error detection circuit comprises: a first resistor connected in series with an AC line; a diode connected in series with the first resistor; a transistor including a base, an emitter and a collector, the collector connected to an AC neutral; a first light emitting diode (LED) connected between the diode and the emitter of the transistor; a second resistor connected between the emitter and the base of the transistor; a third resistor connected between the base of the transistor and a ground; a capacitor connected between the AC line and the AC neutral; a zener diode connected in series with the AC line; and a second LED connected between the zener diode and the AC neutral.

In another embodiment of the present invention, a power line surge protection device comprises: an AC plug comprising a first conductor for connection to an AC line, a second conductor for connection to an AC neutral, and a third conductor for connection to a ground; at least one female outlet, each outlet comprising a first, a second, and a third conductor connected, respectively, to the first, the second, and the third conductors of the AC plug; and a wiring error detection circuit.

In yet another embodiment of the present invention, an AC surge suppression board comprises: a wiring error detection circuit for providing the status of the wiring of an AC outlet and the status of the AC outlet's ground connection; an AC overvoltage protection circuit for protecting an AC line from overvoltage conditions; and a switch for turning the surge suppression board on and off.

In another embodiment of the present invention, a grounding module comprises: a housing; an AC plug, the plug comprising a first conductor for connection to an AC line, a second conductor for connection to an AC neutral and a third conductor for connection to a ground; at least one female outlet, the outlet comprising a first, a second, and a third conductor connected, respectively, to the first, the second and the third conductors of the AC plug; a wiring error detection circuit for providing the status of the wiring of an AC outlet when the AC plug is inserted into the AC outlet; and at least one external ground connection connected to the ground for providing the ground to an electrical device.

The above advantages and features are of representative embodiments only, and are presented only to assist in understanding the invention. It should be understood that they are not to be considered limitations on the invention as defined by the claims, or limitations on equivalents to the claims. For instance, some of these advantages may seem mutually contradictory, in that they cannot be simultaneously implemented in a single embodiment. Similarly, some advantages are primarily applicable to one aspect of the invention. Thus, this summary of features and advantages should not be considered dispositive in determining equivalence. Additional features and advantages of the invention will become apparent in the following description, from the drawings, and from the claims.

DESCRIPTION OF THE PREFERRED EMBODIMENTS

In the following description of the various embodiments, reference is made to the accompanying drawings which form a part hereof, and which show by way of illustration various embodiments in which the invention may be practiced. It is to be understood that other embodiments may be utilized and structural and functional modifications may be made without departing from the scope of the present invention.

Figure 1:
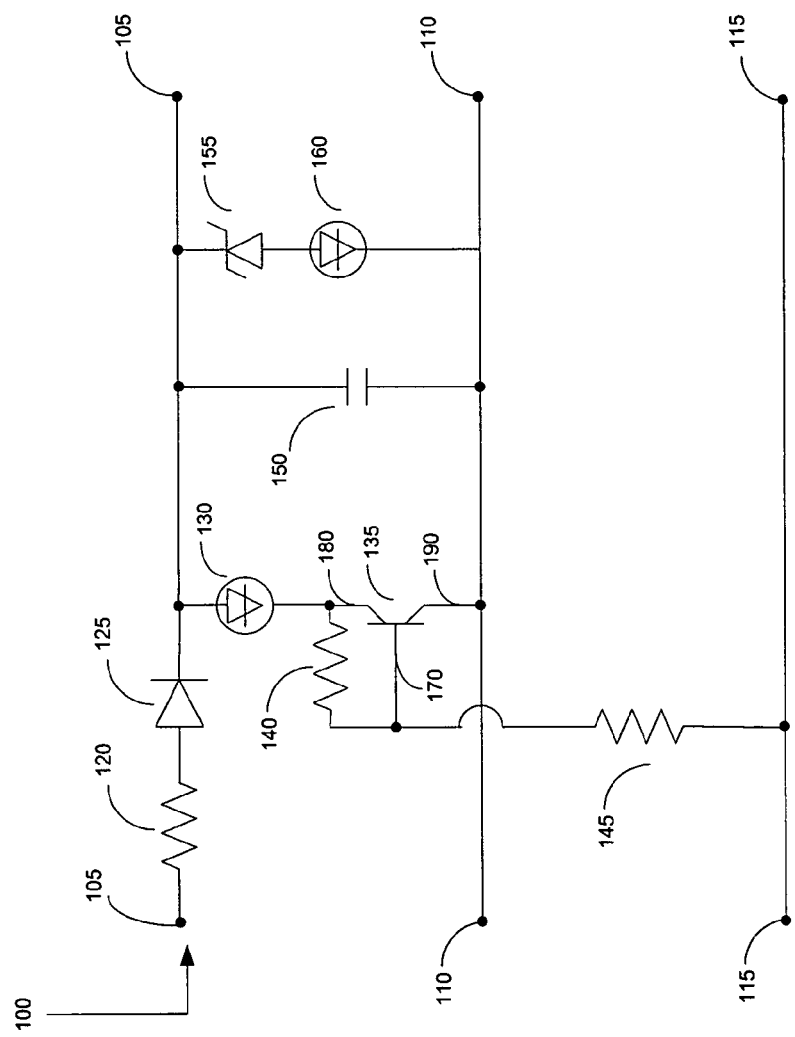
FIG. 1 is a schematic diagram of a wiring error detection circuit in accordance with the present invention.

FIG. 1 is a schematic diagram of a wiring error detection circuit 100 in accordance with the present invention. As shown in FIG. 1, the circuit 100 is connected to an AC line 105, an AC neutral 110 and a ground 115. The circuit 100 includes a resistor 120 connected in series with the AC line 105 and, a resistor 145 that is connected in series with the ground 115. As shown in FIG. 1, a diode 125 is connected in series with the resistor 120 and a capacitor 150. The circuit 100 also includes a transistor 135 that has a base 170, an emitter 180, and a collector 190. The emitter 180 of the transistor 135 is connected to a green light emitting diode (LED) 130 and to a resistor 140, the base 170 is connected to the resistors 140, 145 and the collector 190 is connected to the AC neutral 110. The circuit 100 also includes the capacitor 150 that is connected to the AC line 105 and the AC neutral 110. In parallel with the capacitor 150 is a zener diode 155 that is connected to the AC line 105. A red LED 160 is connected in series with the zener diode 155 and the AC neutral 110.

The resistors 120, 140 are 10 kilo-ohm, 3 watt resistors and, the resistor 145 is a 330 kilo-ohm, 1/4 watt resistor. In an alternative variant of the present invention, the resistor 145 may be a 330–600 kilo-ohm, 1/4 watt resistor. The diode 125 is a type IN4007, 1 amp, 1000 volt PIV diode. The zener diode 155 is a type IN4762, 82 volt, 1 watt diode. The capacitor 150 is a 0.22 micro-farad, 250 volt capacitor made by PANASONIC and sold under part number ECQ-E2224KF. The LED 130 is a type 5400A5 LED and, the LED 160 is a type 5400A1 LED. The transistor 135 is a type MPSA92, PNP high-voltage transistor.

When the circuit 100 is connected to an AC outlet (not shown), it may perform two functions: 1) partially illuminating the LEDs 130, 160 to indicate that the wiring for the AC line 105 and the AC neutral 110 of the AC outlet is reversed, and 2) illuminating the LED 130 to indicate that the AC outlet has a good ground connection and/or illuminating the LED 160 to indicate that the AC outlet has a bad ground connection. In both circumstances, the circuit 100 prevents a person from injuring themselves and/or damaging an electronic device by plugging the electronic device into an AC outlet.

In the circumstance where the wiring of the AC line 105 and the AC neutral 110 is reversed, the reverse biasing of the transistor 135 causes the transistor 135 to not properly turn on. This, in turn, causes the voltage level across the zener diode 155 to rise, which then causes the LEDs 130, 160 to partially illuminate.

In the circumstance where the wiring of the AC line 105 and the AC neutral 110 is proper and the AC outlet is good (i.e., the AC line 105 and AC neutral 110 are properly wired), the transistor 135 is properly biased. This causes the LED 130 to become illuminated because the voltage across the zener diode 155 is low enough to keep the LED 160 extinguished.

The circuit 100 may be used in a number of electronic devices that are plugged into AC outlets such as telecommunications test equipment, computers, televisions, stereo equipment, home appliances, etc. In addition, the circuit 100 may be used in devices that act as conduits between telecommunications test equipment, computers, televisions, stereo equipment, home appliances, etc. and AC outlets such as a power line surge protection device 200 (shown in FIG. 2) and a grounding module 800 (shown in FIG. 8).

Figure 2:
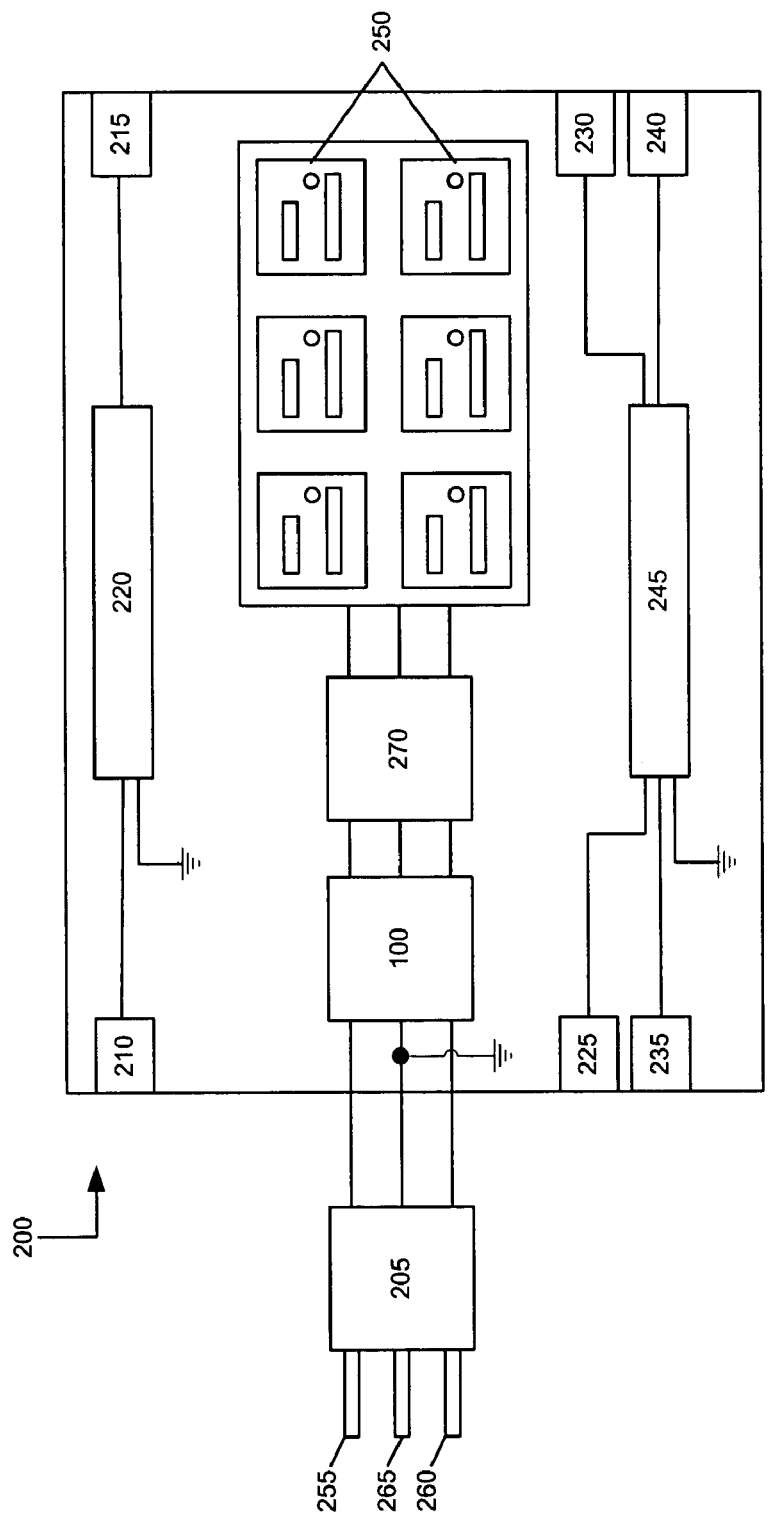
FIG. 2 is an example implementation of the wiring error detection circuit in a power line surge protection device in accordance with the present invention.

FIG. 2 is an example implementation of the wiring error detection circuit 100 in a power line surge protection device 200 in accordance with the present invention. The device 200 includes a three-prong male AC plug 205 that is adapted to plug into an AC outlet (not shown). The plug 205 has three conductors: an AC power line or AC line 255, an AC neutral 260 and a ground 265. The device 200 has two RJ-11 jacks 210, 215 to which a telephone voice line or FAX line may be connected. Between the jacks 210, 215 is an overvoltage and overcurrent protection circuit 220 that is described in detail hereinafter with reference to FIG. 4. The device 200 also has two Universal Serial Bus (USB) ports 225, 230, and two RJ-45 jacks 235, 240 to which a high speed data line may be connected. Between the USB ports 225, 230 and the RJ-45 jacks 235, 240 is an overvoltage and overcurrent protection circuit 245 that is described in detail hereinafter with reference to FIG. 3. The device 200 additionally includes an AC overvoltage protection circuit 270 and female AC outlets 250. The female AC outlets 250 each include a first, second, and third conductor (conductors not shown) for connecting to the first, second, and third conductors (i.e., AC line 255, AC neutral 260 and ground 265) of the AC plug 205. The AC overvoltage protection circuit 270 includes an operating indicator and is described in detail hereinafter with reference to FIG. 5. The device 200 further includes the wiring error detection circuit 100.

Figure 3:
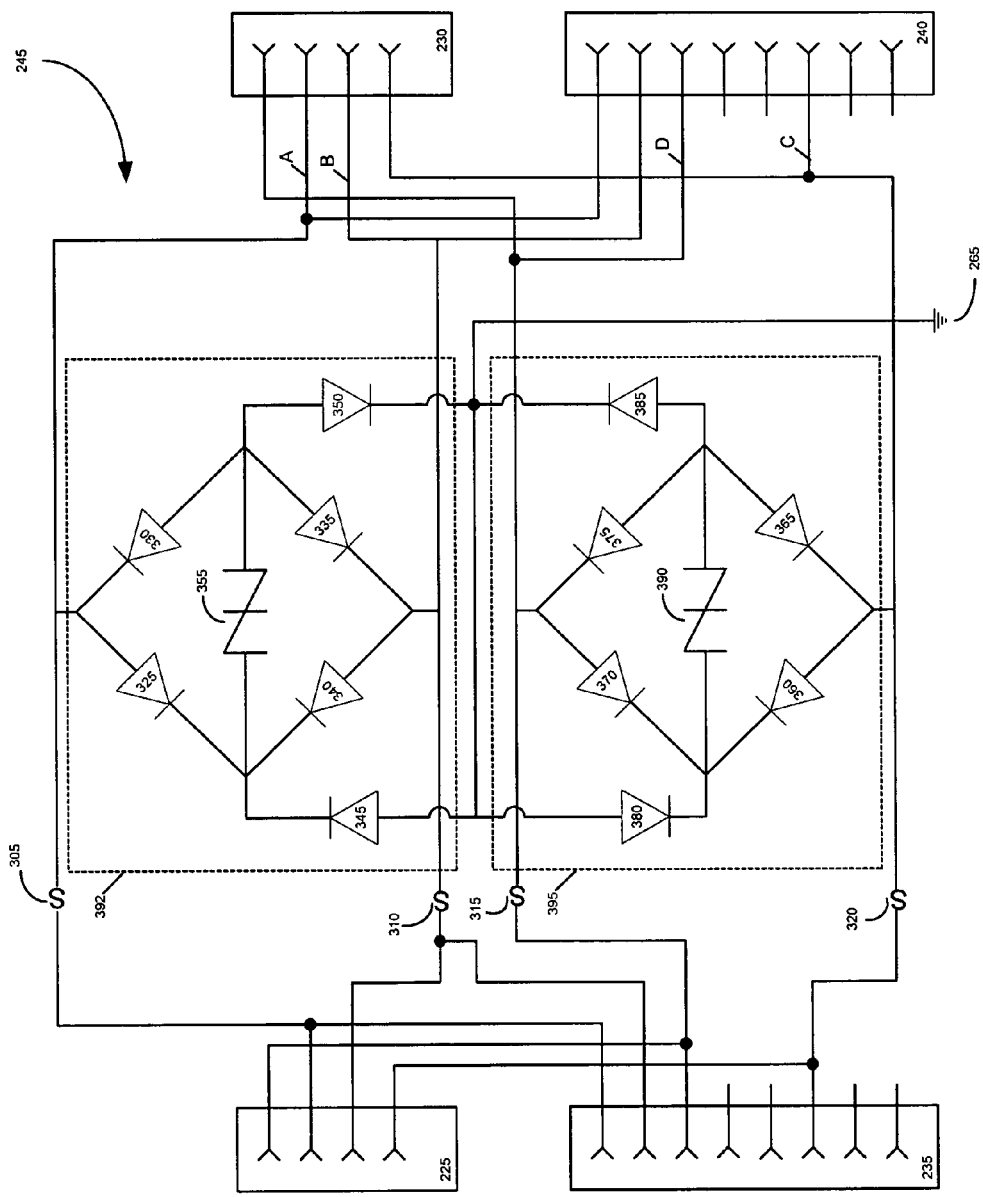
FIG. 3 is a schematic diagram of a high speed data line overvoltage and overcurrent protection circuit for a high speed digital network operating at 10BASE-T Ethernet or 100BASE-TX Fast Ethernet in accordance with the present invention.

FIG. 3 is a schematic diagram of the high speed data line overvoltage and overcurrent protection circuit 245 for a high speed digital network operating at 10BASE-T Ethernet or 100BASE-TX Fast Ethernet in accordance with the present invention. The circuit 245 is connected between USB ports 225, 230 (of FIG. 2), and RJ-45 jacks 235, 240 (of FIG. 2). The circuit 245 provides both overvoltage protection as well as overcurrent protection. The overcurrent protection of circuit 245 is provided by several fuses 305, 310, 315, 320 that may be 250 volt, 350 milliampere fuses made by WICKMANN. In operation the fuses 305, 310, 315, 320 allow the circuit 245 to fuse open safely in case of dangerous power exposure to the circuit 245 or electronic equipment connected thereto.

The overvoltage protection of the circuit 245 includes several diodes 325, 330, 335, 340, 345, 350, 360, 365, 370, 375, 380, 385, and two thyristors 355, 390. The diodes 325, 330, 335, 340, 345, 350 form a first diode bridge 392 and the thyristor 355 is connected across the first diode bridge 392. Similarly, the diodes 360, 365, 370, 375, 380, 385 form a second diode bridge 395 and the thyristor 390 is connected across the second diode bridge 395. The first and second diode bridges 392, 395 are connected across the USB ports 225, 230 and the RJ-45 jacks 235, 240. The first and second diode bridges 392, 395 are also connected to the ground 265 (of FIG. 2) at one end.

The USB ports 225, 230 and the RJ-45 jacks 235, 240 are provided to carry incoming data signals. The first and second diode bridges 392, 395 limit the voltage coming from the USB ports 225, 230 and the RJ-45 jacks 235, 240 in the event that the voltage exceeds, for example, normal digital signal levels. The diodes 325, 330, 335, 340, 360, 365, 370, 375 are type IN4007, 1 amp, 1000 volt PIV diodes. The diodes 345, 350, 380, 385 are type RL207, 2 amp, 1000 volt PIV diodes. The thyristors 355, 390 are SIDACtor® type made by Teccor Electronics and sold under part number P0300EC.

The thyristors 355, 390 are used to protect the circuit 245 from electrical disturbances caused by lightening induced surges, inductive coupled spikes, and AC power cross conditions. Using the thyristors 355, 390 provides, inter alia, several benefits: (1) the thyristors 355, 390 cannot be damaged by voltage, (2) the thyristors 355, 390 eliminate voltage overshoot caused by fast rising transients, and (3) the thyristors 355, 390 have low capacitance, making them ideal for high speed transmission equipment.

Excess positive voltages appearing at terminal A are clamped by the diodes 350, 325 and the thyristor 355. Excess negative voltages appearing at terminal A are clamped by the diodes 345, 330 and the thyristor 355. Excess positive voltages appearing at terminal B are clamped by the diodes 340, 350 and the thyristor 355. Excess negative voltages appearing at terminal B are clamped by the diodes 335, 345 and the thyristor 355. Excess positive voltages appearing at terminal C are clamped by the diodes 360, 385 and the thyristor 390. Excess negative voltages appearing at terminal C are clamped by the diodes 365, 380 and the thyristor 390. Excess positive voltages appearing at terminal D are clamped by the diodes 370, 385 and the thyristor 390. Excess negative voltages appearing at terminal D are clamped by the diodes 375, 380 and the thyristor 390.

The overvoltage protection of the circuit 245 may further include two three-electrode gas tubes (not shown), one connected across the output side of the fuses 305, 310, and the other connected across the output side of the fuses 315, 320. The gas tubes conduct when the voltage on either sides of the fuses 305, 310, 315, 320, to which they are connected, exceeds a threshold value. The breakdown voltage may be between about 150 and about 300 volts, with a breakdown voltage on the order of 250 volts being preferred. A suitable three-electrode gas tube is shown in U.S. Pat. No. 4,212,047 issued to Napiorkowski on Jul. 8, 1980. Another suitable three-electrode gas tube is available from TII Industries, Inc., Copiague, N.Y. sold as TII 71 type or 73/75 type with a voltage breakdown range of 150–300 VDC.

Figure 4:
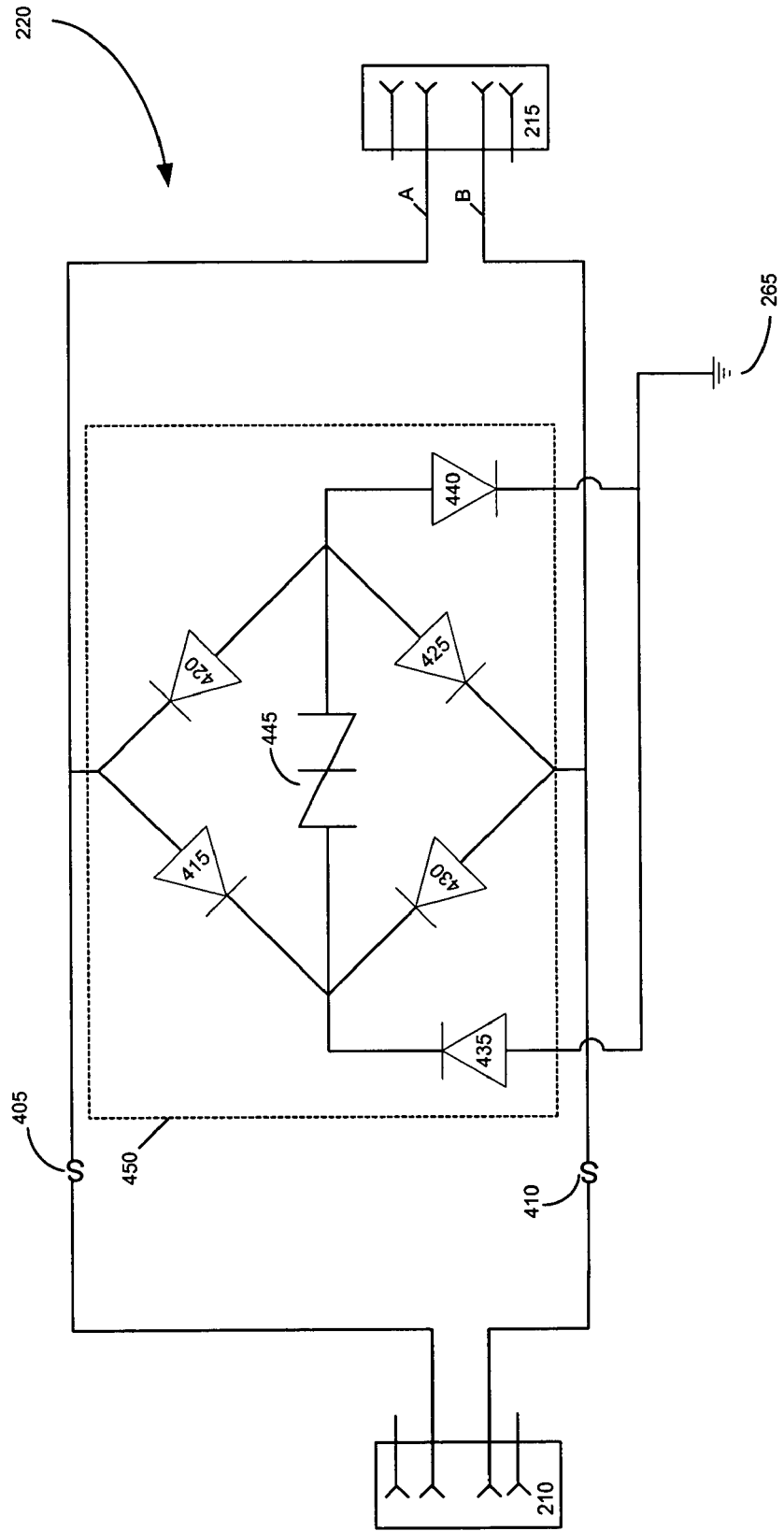
FIG. 4 is a schematic diagram of an overvoltage and overcurrent protection circuit for a telephone voice line in accordance with the present invention.

FIG. 4 is a schematic diagram of an overvoltage and overcurrent protection circuit 220 for a telephone voice line in accordance with the present invention. The circuit 220 is connected between the RJ-11 jacks 210, 215. The circuit 220 provides both overvoltage protection as well as overcurrent protection. The overcurrent protection of the circuit 220 is provided by two fuses 405, 410 which are 250 volt, 350 milliampere fuses made by WICKMANN. In operation, the fuses 405, 410 allow the circuit 220 to fuse open safely in case of dangerous power exposure to the circuit 220 or to electronic equipment connected thereto.

The overvoltage protection of the circuit 220 includes several diodes 415, 420, 425, 430, 435, 440 and a thyristor 445. The diodes 415, 420, 425, 430, 435, 440 form a diode bridge 450 and the thyristor 445 is connected across the diode bridge 450. The diode bridge 450 is connected across the RJ-11 jacks 210, 215. The diode bridge 450 is also connected to the ground 265 (of FIG. 2) at one end. In operation, the diode bridge 450 limits the voltage coming from the RJ-11 jacks 210, 215 in the event that the voltage substantially exceeds, for example, normal digital signal levels. The diodes 415, 420, 425, 430 are type IN4007, 1 amp, 1000 volt PIV diodes. The diodes 435, 440 are type RL207, 2 amp, 1000 volt PIV diodes. The thyristor 445 is a SIDACtor® type thyristor made by Teccor Electronics and sold under part number P3100EC. The thyristor 445 is used to protect the circuit 220 from electrical disturbances caused by lightening induced surges, inductive coupled spikes, and AC power cross conditions. It is to be understood that the thyristor 445 provides the same or similar benefits as thyristors 355, 390 shown in FIG. 3.

Excess positive voltages appearing at terminal A are clamped by the diodes 440, 415 and the thyristor 445. Excess negative voltages appearing at terminal A are clamped by the diodes 435, 420 and the thyristor 445. Excess positive voltages appearing at terminal B are clamped by the diodes 430, 440 and the thyristor 445. Excess negative voltages appearing at terminal B are clamped by the diodes 425, 435 and the thyristor 445.

The overvoltage protection of the circuit 220 may further include a three-electrode gas tube (not shown) connected across the output side of the fuses 405, 410. The gas tube conducts when the voltage on either sides of the fuses 405, 410 exceeds a threshold value. The breakdown voltage may be between about 150 and about 300 volts, with a breakdown voltage on the order of 250 volts being preferred. A suitable three-electrode gas tube is shown in U.S. Pat. No. 4,212,047 issued to Napiorkowski on Jul. 8, 1980. Another suitable three-electrode gas tube is available from TII Industries, Inc., Copiague, N.Y. sold as TII 71 type or 73/75 type with a voltage breakdown range of 150–300 VDC.

Figure 5:
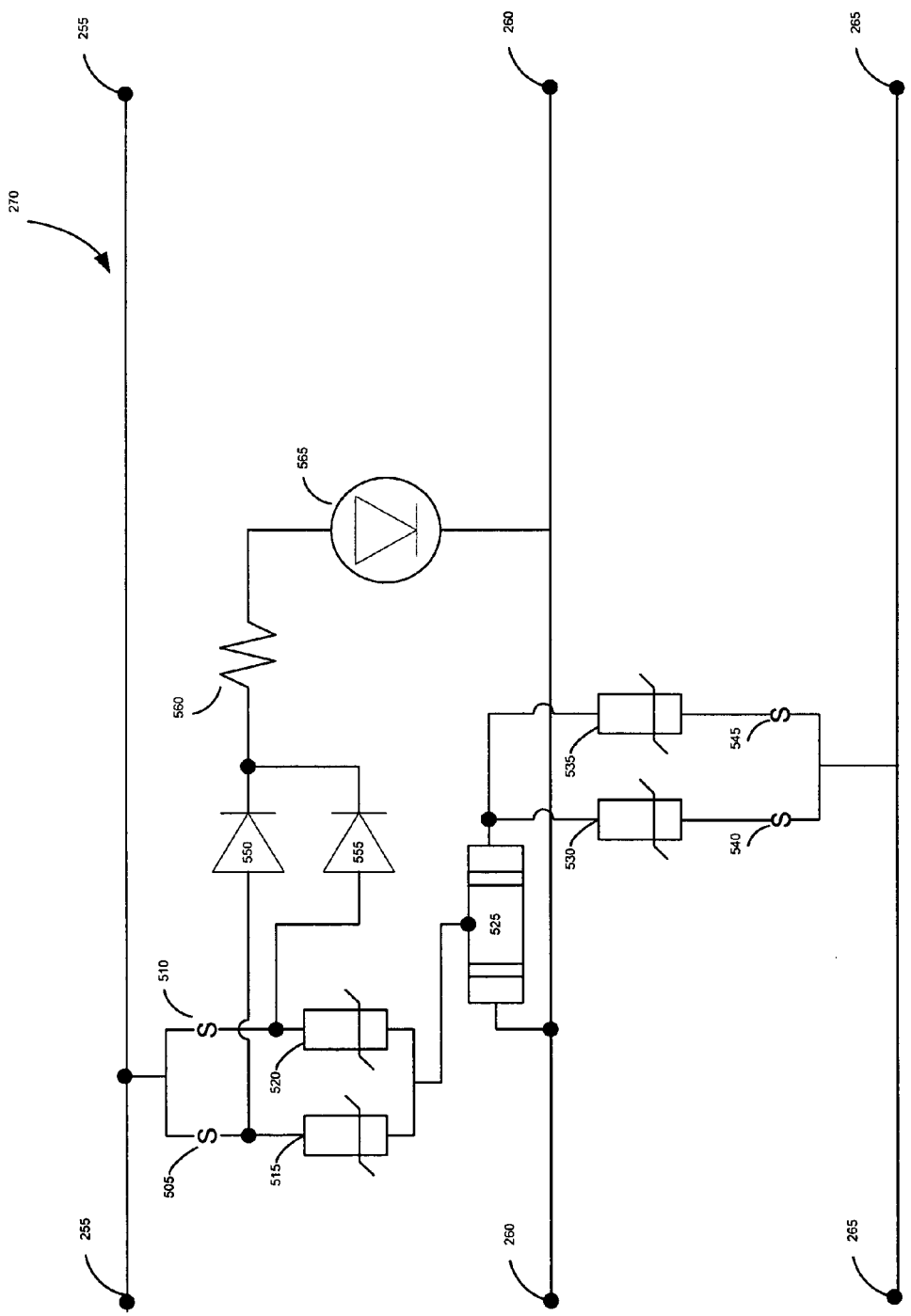
FIG. 5 is a schematic diagram of an AC overvoltage protection circuit in accordance with the present invention.

FIG. 5 is a schematic diagram of an AC overvoltage protection circuit 270 in accordance with the present invention. The circuit 270 employs two thermal fuses 505, 510 connected in series with the AC line 255 (of FIG. 2) and an additional two thermal fuses 540, 545 connected in series with the ground 265 (of FIG. 2). Suitable thermal fuses are available as Microtemp Thermal Cutoffs made by Thermodisc, Incorporated, 1320 South Main Street, Mansfield, Ohio, 44907-0538 under part number RVLU 84C. The fuses 505, 510, 540, 545 open when excessive heat is generated within a module housing the circuit 270. Two Metal Oxide Varistors (MOVs) 515, 520 are connected between the AC line 255 and an electrode of a gas tube 525. Two MOVs 530, 535 are connected between the AC neutral 260 (of FIG. 2) and another electrode of the gas tube 525. The MOVs 515, 520, 530, 535 are 95 volt devices that are available from Maida Development Company under part number D6521Z0950RA65. The gas tube 525 is an TII 11B gas tube that is available from TII Industries, Inc., Copiague, N.Y. and has a breakdown voltage in the range of 300 to 500 volts.

The circuit 270 also includes a diode 550 connected between the thermal fuse 505 and the MOV 515. In parallel with the diode 550 is a diode 555 that is connected between the thermal fuse 510 and the MOV 520. The diodes 550, 555 are type IN4007, 1 amp, 1000 volt PIV diodes. Connected in series to the diodes 550, 555 is a resistor 560 that is a 10 kilo-ohm, 3 watt resistor. Connected to the resistor 560 in series is a green LED 565 that is a type 5400A5 LED. In operation, the LED 565 is illuminated to indicate to a user that the circuit 270 is operating properly. To the contrary, if the LED 565 is not illuminated the circuit 270 is not operating properly.

The circuit 270 as shown in FIG. 5 has been tested and meets the requirements of Underwriters Laboratories Standard 1449, Second Edition. The MOVs 515, 520, 530, 535 ensure that the gas tube 525 will turn off after a voltage surge has caused the gas tube 525 to turn on. Also, because the gas tube 525 is in series with the MOVs 515, 520, 530, 535 the gas tube 525 ensures that there will be only a very small leakage current through the MOVs 515, 520, 530, 535 in the absence of a voltage surge sufficient to cause the gas tube 525 to conduct.

In an alternative embodiment, the circuit 270 may be one of the AC overvoltage protection circuits described in U.S. Pat. No. 6,252,754 issued to Nisar A. Chaudhry on Jun. 26, 2001, a copy of which is incorporated herein by reference.

In an alternative embodiment power line surge protection device 200 (shown in FIG. 2) may also include F-type coaxial connectors to which a coaxial transmission line may be connected. Between the F-type connectors may be a coaxial surge arrestor described in U.S. Pat. No. 5,566,056 issued to Nisar A. Chaudhry on Oct. 15, 1996 a copy of which is incorporated herein by reference.

The power line surge protection device 200 offers electronic devices that connect to it AC overvoltage protection and telephone lines and ethernet cables that connect to it overvoltage and overcurrent protection. In addition, the device 200 provides the status of the wiring of an AC outlet and the status of the AC outlet's ground connection to which the device 200 is connected. This is accomplished by using the circuit 100 with the device 200. The circuit 100 is positioned in the device 200 so that it is fairly secure and then the circuit's 100 and the device's 200 AC lines 105, 255, AC neutrals 110, 260 and grounds 115, 265 are connected to each other so that upon connection of the device 200 to an AC outlet the circuit 100 may be utilized.

Figure 6:
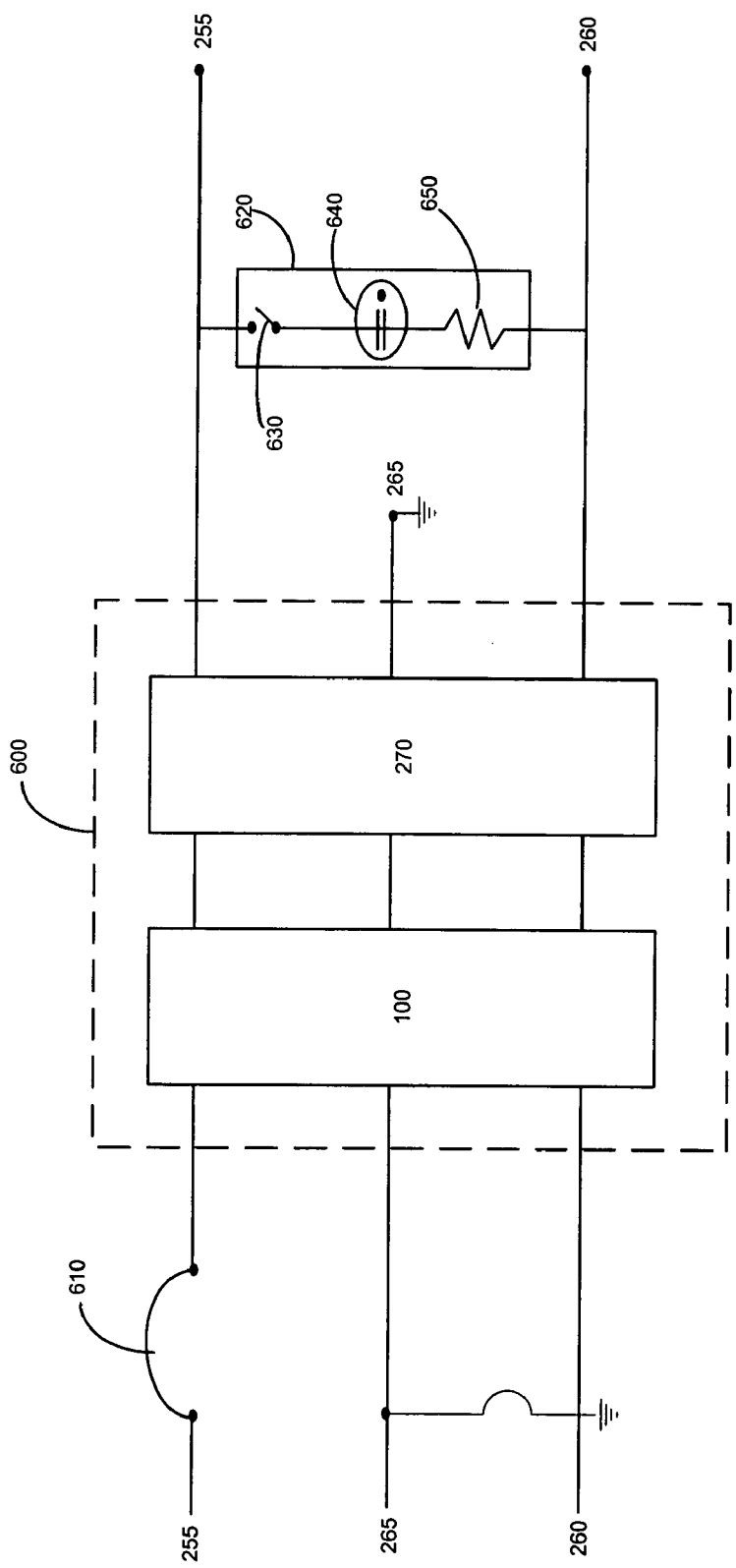
FIG. 6 is a schematic diagram of an AC surge suppression board for use with the present invention.

FIG. 6 is a schematic diagram of an AC surge suppression board 600 in accordance with the present invention. In operation, the board 600 is implemented in the device 200 (or by itself) to provide surge protection for any electronic devices connected thereto. The board 600 includes the wiring error detection circuit 100 (shown in FIG. 1) and the AC overvoltage protection circuit 270 (shown in FIG. 5). The circuits 100, 270 each have a connection to the ground 265 (of FIG. 2). The input of the board 600 is connected to a circuit breaker 610, which is in series with the AC line 255 of FIG. 2. The output of the board 600 is connected to an ON/OFF switch 620. The switch 620 is connected between the AC line 255 and the AC neutral 260 of FIG. 2. The switch 620 includes a single pole, single throw AC switch 630, a neon lamp 640 and a resistor 650. The switch 620 may be a Rocker Switch, which is available from Rong Feng Industrial Co., Ltd., under part number RF-1001.

Figure 7:
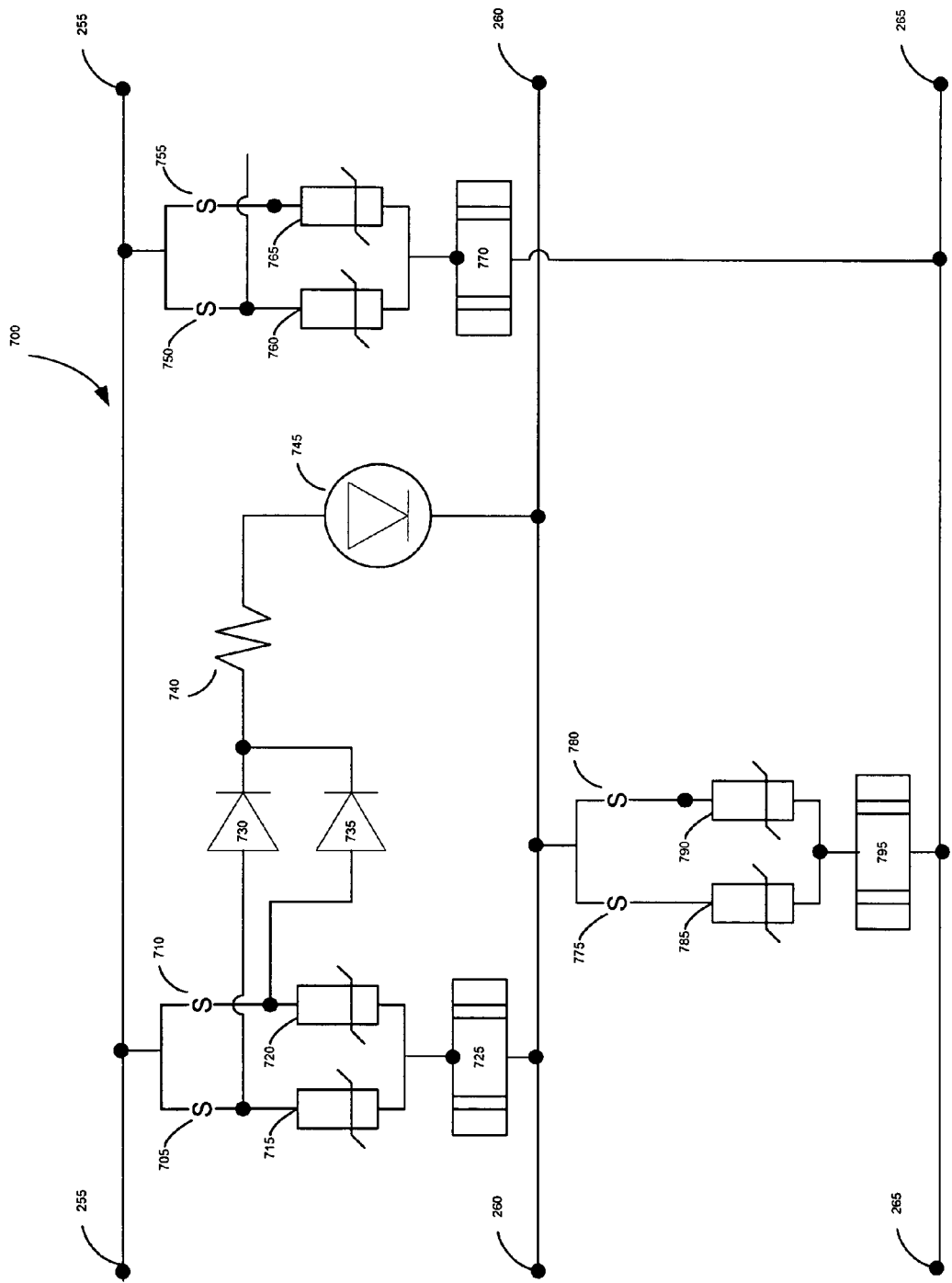
FIG. 7 is a schematic diagram of an alternative variant of an AC overvoltage protection circuit for use with the power line surge protection device of FIG. 2 in accordance with the present invention.

FIG. 7 is a schematic diagram of an alternative AC overvoltage protection circuit 700 for use with the power line surge protection device 200 (of FIG. 2) in accordance with the present invention. The circuit 700 includes several thermal fuses 705, 710, 750, 755 connected in series with the AC line 255 (of FIG. 2) and two thermal fuses 775, 780 connected in series with the AC neutral 260 (of FIG. 2). Suitable thermal fuses such as Microtemp Thermal Cutoffs made by Thermodisc, Incorporated, 1320 South Main Street, Mansfield, Ohio, 44907-0538 under part number RVLU 84C are used in this implementation. The fuses 705, 710, 750, 755, 775, 780 open when excessive heat is generated within a device housing the circuit 700. Two MOVs 715, 720 are connected between the AC line 255 and one electrode of the gas tube 725. The other electrode of the gas tube 725 is connected to the AC neutral 260. Two MOVs 760, 765 are also connected between the AC line 255 and one electrode of the gas tube 770. The other electrode of the gas tube 770 is connected to the ground 265 (of FIG. 2). And, two MOVs 785, 790 are connected between the AC neutral 260 and one electrode of the gas tube 795. The other electrode of the gas tube 795 is connected to the ground 265. The MOVs 715, 720, 760, 765, 785, 790 are 95 volt devices available from Maida Development Company under part number D6521Z0950RA65. The gas tubes 725, 770, 795 are two-electrode gas tubes that have a breakdown voltage in the range of 300–500 volts and are available from TII Industries, Inc., Copiague, N.Y.

The circuit 700 also includes a diode 730 connected between the thermal fuse 705 and the MOV 715. In parallel with the diode 730 is a diode 735 that is connected between the thermal fuse 710 and the MOV 720. The diodes 730, 735 are type IN4007, 1 amp, 1000 volt PIV diodes. A resistor 740 is connected in series with the diodes 730, 735 and is a 10 kilo-ohm, 3 watt resistor. Connected to the resistor 740 in series is a green LED 745 that is a type 5400A5 LED. In operation, the green LED 745 is illuminated to indicate to a user that the circuit 700 is operating properly. Thus, if the green LED 745 is not illuminated the circuit 700 is not operating properly.

Figure 8:
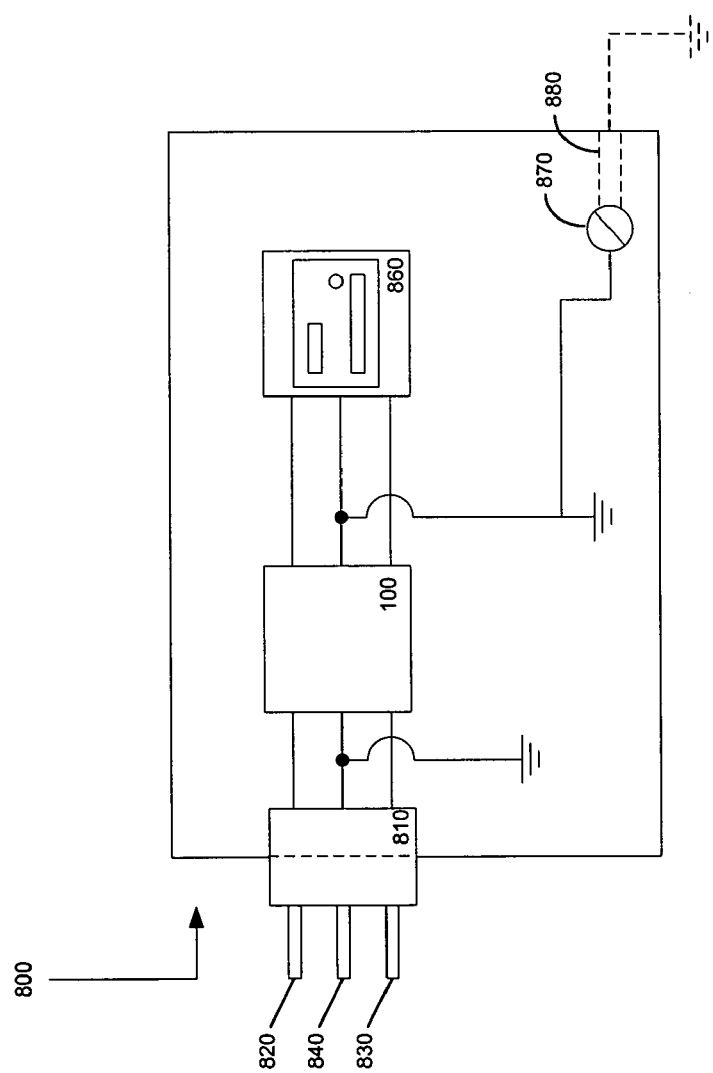
FIG. 8 is an example implementation of the wiring error detection circuit of FIG. 1 in a grounding module in accordance with the present invention.

FIG. 8 is an example implementation of the wiring error detection circuit 100 (of FIG. 1) in a grounding module 800 in accordance with the present invention. As shown in FIG. 8, the module 800 includes a three-prong male AC plug 810 that is adapted to plug into an AC outlet (not shown). In this embodiment, the AC plug 810 is disposed within the housing of the module 800. In an alternative embodiment, however, the AC plug 810 may be connected to the module 800 via a power chord (not shown). It should be noted that the power chord may be fixed to the module 800 or removable from the module 800 by plugging a female end thereof into male conductors positioned in or projecting from the module 800. As shown in FIG. 8, the grounding module 800 has three conductors: an AC power line or AC line 820, an AC neutral 830 and a ground 840. The module 800 also includes the wiring error detection circuit 100 and a female outlet 860. The female outlet 860 includes a first, second and third conductor (conductors not shown) for connecting to the first, second and third conductors, respectively, of the AC plug 810. The module 800 additionally includes an external ground connection in the form of a screw 870 and, a passage 880 that communicates with the screw 870 and receives external grounding wires.

Figure 9:
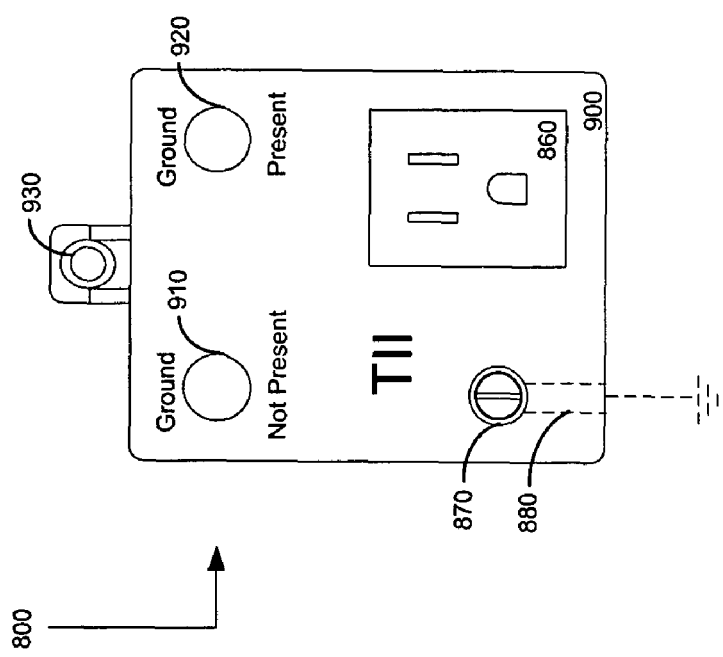
FIG. 9 is a front view of the grounding module in accordance with the present invention.

FIG. 9 is a front view of the module 800 of FIG. 8 in accordance with the present invention. As shown in FIG. 9, the module 800 includes the female outlet 860 and the external ground connection 870 and passage 880 of FIG. 8. The module 800 also includes two LED covers 910, 920, an opening 930 and an insulated housing 900. The screw 870 provides the ground 840 (of FIG. 2) to electrical devices that employ a grounding wire. Such devices may be for example, dishwashing machines, refrigerators, clothes washers, computers or telecommunications test equipment. In order to provide the ground 840 to an electrical device via the screw 870, a user inserts the grounding wire into the passage 880 that communicates with the screw 870. The grounding wire is then secured by tightening the screw 870. In an alternative embodiment, the grounding wire may be secured into the passage 880 by another fastener such as a nut, clamp or latch. It should also be noted that the passage 880 may extend from the module 800 to enable a user to insert a grounding wire into it more easily.

As further shown in FIG. 9, the LED covers 910, 920 are positioned above the LEDs 160, 130 of the wiring error detection circuit 100 of FIG. 1 so that the LEDs 160, 130 may be viewed when they are illuminated. In operation, the LED covers 910, 920 are used to indicate that the AC line 820 (of FIG. 2) and the AC neutral 830 (of FIG. 2) are reversed wired when the LEDs 160, 130 are illuminated at the same time. In addition, the LED cover 920 indicates that a ground is present when the module 800 is plugged into an AC outlet. The LED cover 910 indicates that a ground is not present when the module 800 is plugged into an AC outlet.

The LED cover 910, 920 are colored red and green, respectively, although any appropriate color LED cover and LED (for use with circuit 100) may be used such as green, white, yellow, etc. Moreover, the LED covers 910, 920 may be used interchangeably thereby allowing for the LED cover 920 to be in the LED cover's 910 location and the LED cover 910 to be in the LED cover's 920 location. As further shown in FIG. 9, the opening 930 is provided to enable a user to secure the module 800 to a wall or some other receptacle by using for example, a screw or nail to prevent the module 800 from falling out of the AC outlet to which it is plugged into.

Figure 10:
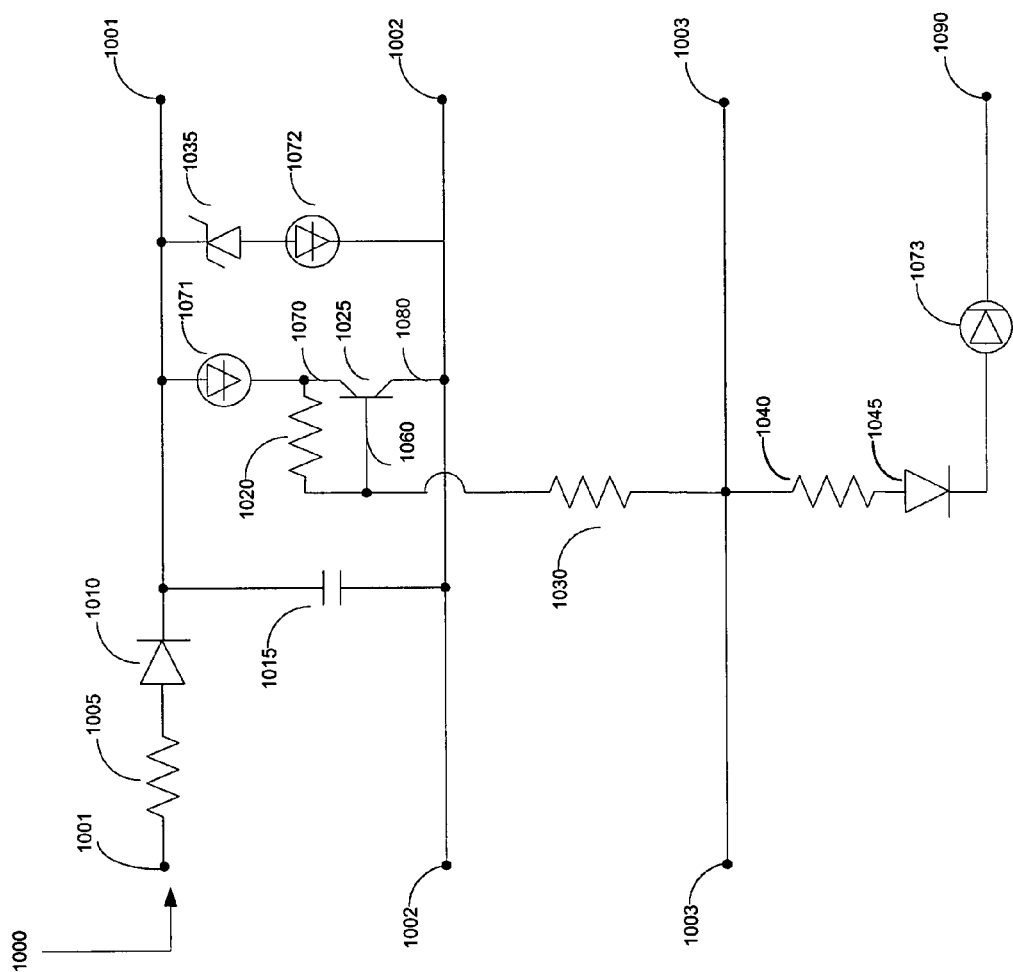
FIG. 10 is a schematic diagram of an alternative variant of the wiring error detection circuit in accordance with the present invention.

FIG. 10 is a schematic diagram of an alternative variant of the wiring error detection circuit in accordance with the present invention. As shown in FIG. 10, the circuit 1000 is connected to: an AC line 1001, an AC neutral 1002 and a ground 1003. The circuit 1000 includes a resistor 1005 connected in series with the AC line 1001 and, a resistor 1030 that is connected in series with the ground 1003. As shown in FIG. 10, the diode 1010 is connected in series with the resistor 1005 and with a capacitor 1015. The circuit 1000 also includes a transistor 1025 that has a base 1060, an emitter 1070 and a collector 1080. The emitter 1070 is connected to the LED 1071 and to a resistor 1020, the base 1060 is connected to the resistors 1020, 1030 and the collector 1080 is connected to the AC neutral 1002. The circuit 1000 additionally includes the capacitor 1015 connected to the AC line 1001 and the AC neutral 1002. In parallel with the capacitor 1015 is a zener diode 1035 that is connected to the AC line 1001. The LED 1072 is connected in series with the zener diode 1035 and the AC neutral 1002. The circuit 1000 also includes a resistor 1040 connected in series with the ground 1003 and an LED 1073 that is connected to a female F-type coaxial connector 1090. As shown, in FIG. 10, a diode 1045 is connected in series with the resistor 1040 and the LED 1073. In an alternative embodiment, the diode 1045 may be removed from the circuit 1000.

The resistors 1005, 1020 are 10 kilo-ohm, 3 watt resistors, the resistor 1030 is a 330–600 kilo-ohm, 1/4 watt resistor and the resistor 1040 is a 47 kilo-ohm, 1/4 watt resistor. The diodes 1010, 1045 are type IN4007, 1 amp, 1000 volt PIV diodes. The zener diode 1035 is a type IN4764, 82 volt, 1 watt diode. The capacitor 1015 is a 0.22 micro-farad, 250 volt capacitor made by PANASONIC and sold under part number ECQ-E2224KF. The LEDs 1072, 1073 are type 5400A1 and the LED 1071 is type 5400A5. The transistor 1025 is a type MPSA92, PNP high-voltage transistor.

Similar to the circuit 100, the circuit 1000 includes the LEDs 1071, 1072 for indicating whether or not a ground is present and for indicating whether or nor a wiring problem exists in an AC outlet to which the circuit 100 is connected. Circuit 1000 additionally, includes an LED 1073 for indicating by itself whether or not a wiring problem exists in an AC outlet to which the circuit 1000 is connected.

Figure 11:
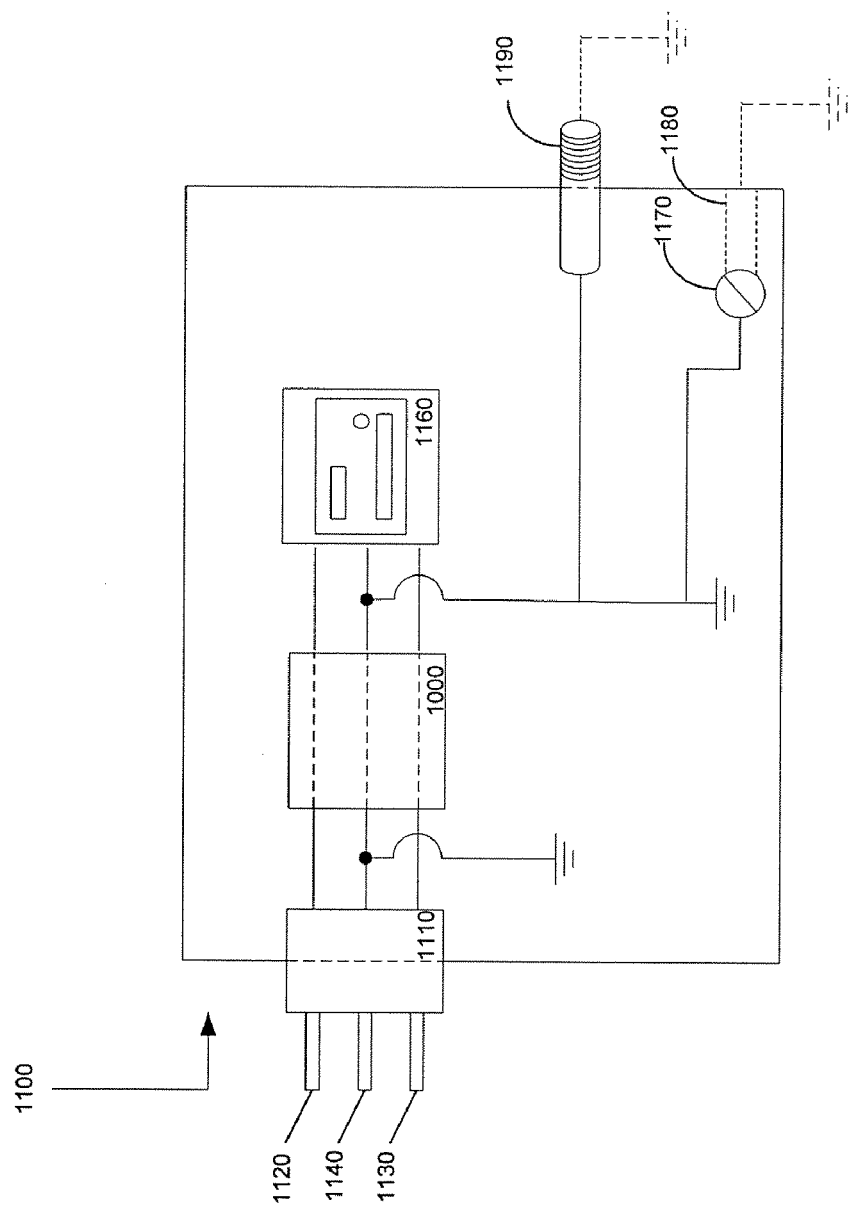
FIG. 11 is a schematic block diagram of an alternative grounding module in accordance with the present invention.

FIG. 11 is a schematic block diagram of an alternative grounding module in accordance with the present invention. As shown in FIG. 11, a module 1100 includes a three-prong male AC plug 1110 that is adapted to plug into an AC outlet (not shown). In this embodiment, the plug 1110 is disposed within the housing of the module 1100. As shown in FIG. 11, the module 1100 has three conductors: an AC power line or AC line 1120, an AC neutral 1130 and a ground 1140. The module 1100 also includes the wiring error detection circuit 1000 (of FIG. 10) and a female outlet 1160. The female outlet 1160 includes a first, second and third conductor (conductors not shown) for connecting to the first, second and third conductors, respectively, of the AC plug 1110. The module 1100 additionally includes an external ground connection in the form of a screw 1170 and a passage 1180 that communicates with the screw 1170 and receives external ground wires. The module 1100 also contains an additional ground connection in the form of a female F-type coaxial connector 1190.

Figure 12:
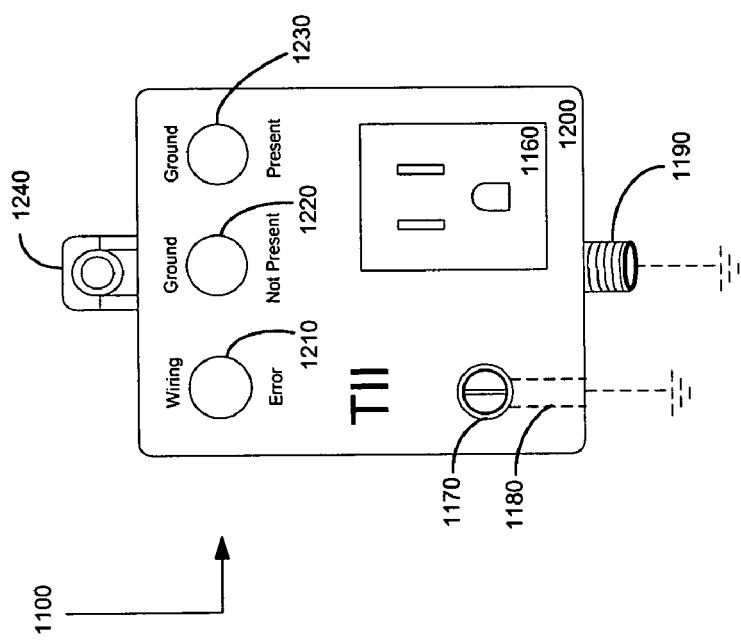
FIG. 12 is a front view of the grounding module in accordance with the present invention.

FIG. 12 is a front view of the grounding module 1100 of FIG. 11 in accordance with the present invention. As shown in FIG. 12, the grounding module 1100 includes the female outlet 1160, external ground connections in the form of a screw 1170 and passage 1180 and a female F-type coaxial connector 1190. The module 1100 also includes three LED covers 1210, 1220, 1230, an opening 1240 and an insulated housing 1200. The female F-type coaxial connector 1190 also provides a ground connection to devices that employ coaxial cables and coaxial connecting means. Such devices may be for example, cable modems, televisions, set-top boxes, digital video disks (DVDs), stereo equipment, computers, telecommunications test equipment, etc.

As further shown in FIG. 12, the LED covers 1210, 1220, 1230 are positioned above the LEDs 1073, 1072, 1071 of the wiring error detection circuit 1000 of FIG. 10 so that the LEDs 1073, 1072, 1071 may be viewed when they are illuminated. In operation, the LED covers 1220, 1230 are used to indicate whether or not the ground 1003 (of FIG. 10) is present when the module 1100 is inserted into an AC outlet. For example, the LED cover 1220 indicates that a ground is not present when the LED it covers is solely illuminated and the LED cover 1230 indicates that a ground is present when the LED it covers is solely illuminated. In addition, both LEDs 1220, 1230 indicate that there is a problem with the wiring of the AC outlet to which the module 1100 is plugged into when the LEDs they cover are illuminated at the same time. The LED cover 1210 also indicates that there is a problem with the wiring of the AC outlet to which the module 1100 is plugged into when the LED it covers is solely illuminated.

Figure 13:
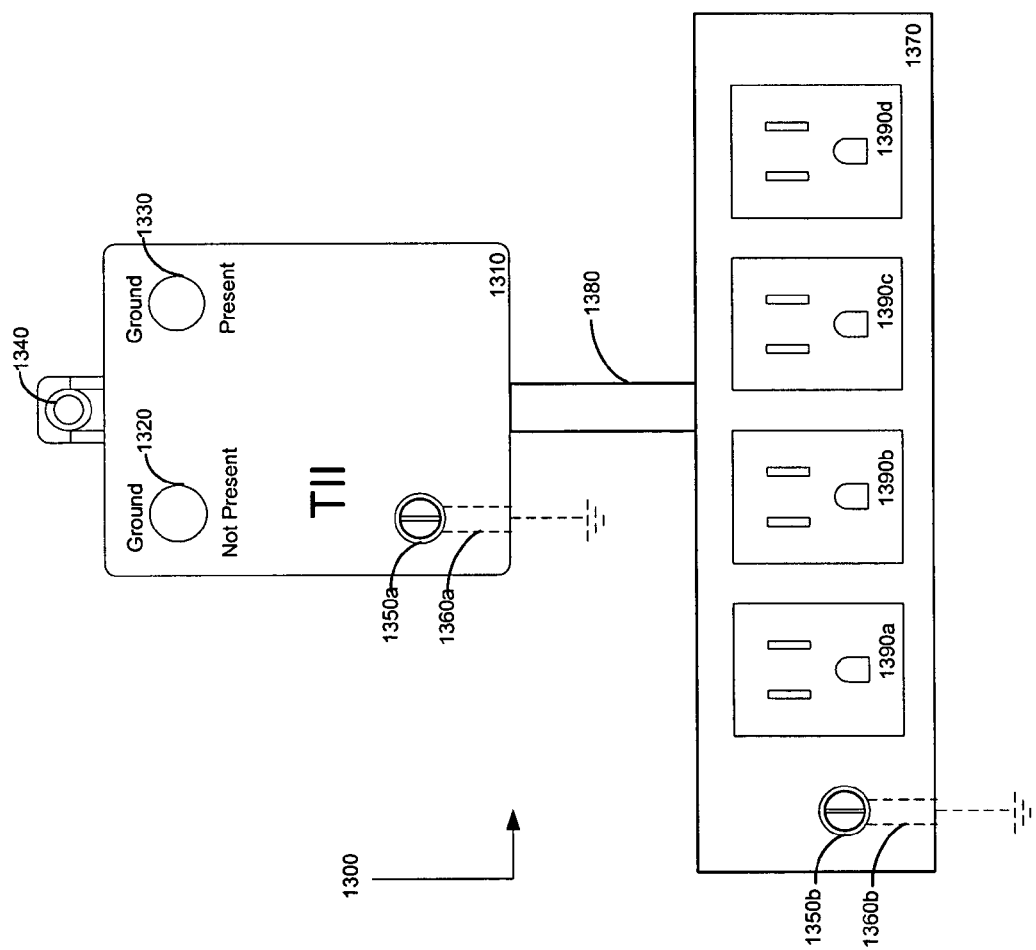
FIG. 13 is a front view of an alternative variant of the grounding module in accordance with the present invention.

FIG. 13 is a front view of an alternative variant of the grounding module in accordance with the present invention. As shown in FIG. 13, the grounding module 1300 includes a first housing 1310 and a second housing 1370 connected via a power chord 1380. The first housing 1310 includes an external ground connection in the form of a screw 1350*a* and a passage 1360*a*. The first housing 1310 also includes two LEDs 1320, 1330 and an opening 1340. The second housing 1370 includes an external ground connection in the form of a screw 1350b and a passage 1360b. The second housing 1370 also includes several female outlets 1390a–d. In another embodiment a female outlet may be included in the first housing 1310. In order to provide a ground to an electrical device via screws 1350a–b, a user inserts the grounding wire into one or both passages 1360a–b, which communicate with screws 1350a–b, respectively. The grounding wire is then secured by tightening screws 1350a–b. As further shown in FIG. 13, the LED covers 1320, 1330 are connected to the wiring error detection circuit 100 of FIG. 1 and cover the LEDs 160, 130, respectively. It is to be noted that the wiring error detection circuit 100 may be included in the second housing 870. As further shown in FIG. 8, the opening 840 is provided to enable a user to secure the grounding module 800 to a wall or some other receptacle.

In other embodiments, a plurality of female outlets may be employed by the grounding modules.

In yet another embodiment, a plurality of ground receptacles and screws may be employed by the grounding modules.

It should be understood that the above description is only representative of illustrative embodiments. For the convenience of the reader, the above description has focused on a representative sample of possible embodiments, a sample that is illustrative of the principles of the present invention. The description has not attempted to exhaustively enumerate all possible variations. That alternate embodiments may not have been presented for a specific portion of the invention, or that further undescribed alternate embodiments may be available for a portion, is not to be considered a disclaimer of those alternate embodiments. Other applications and embodiments can be conceived by those without departing from the spirit and scope of the present invention. It is therefore intended, that the invention is not to be limited to the disclosed embodiments but is to be defined in accordance with the claims that follow. It can be appreciated that many of those undescribed embodiments are within the scope of the following claims, and others are equivalent.

What is claimed is:

1. A grounding module, comprising:
   a housing;
   an AC plug configured to engage an AC outlet, the plug comprising a first conductor for connection to an AC line of the AC outlet, a second conductor for connection to an AC neutral of the AC outlet and a third conductor for connection to a ground of the AC outlet;
   at least one female outlet, the outlet comprising a first, a second, and a third conductor connected, respectively, to the first, the second and the third conductors of the AC plug;
   a wiring error detection circuit for providing the status of the wiring of the AC outlet when the AC plug is inserted into the AC outlet; and
   at least one external ground connection connected to the ground for providing the ground to an electrical device.

2. The grounding module of claim 1, wherein the wiring error detection circuit indicates that there is a wiring problem in an AC outlet to which the module is connected by illuminating a first LED and a second LED.

3. The grounding module of claim 1, further comprising:
   a screw for securing a grounding wire from an electrical device to the grounding module.

4. The grounding module of claim 1, further comprising:
   a means for securing a grounding wire from an electrical device to the grounding module.

5. The grounding module of claim 1, further comprising:
   an AC overvoltage protection circuit for protecting against overvoltage conditions appearing on the AC line.

6. The grounding module of claim 5, further comprising:
   an LED for indicating whether or not an AC overvoltage condition exists.

7. The grounding module of claim 1, wherein the AC plug is disposed within the housing.

8. The grounding module of claim 1, wherein the AC plug is connected to the grounding module via a power chord.

9. The grounding module of claim 1, further comprising:
   at least one coaxial connector connected to the ground for providing the ground to a device comprising a coaxial cable.

10. The grounding module of claim 9, wherein the coaxial connector is a female F-type coaxial connector.

11. The grounding module of claim 1, further comprising:
    an LED for indicating the presence of a wiring problem in the AC outlet.

12. The grounding module of claim 11, wherein the problem in the AC outlet results from reversed AC line and AC neutral wiring.

13. The grounding module of claim 1, wherein the presence of an AC outlet's ground to which the module is connected is indicated by illuminating a first LED by itself.

14. The grounding module of claim 1, wherein the absence of an AC outlet's ground to which the module is connected is indicated by illuminating a first LED by itself.

* * * * *